United States Patent [19]

Tanimura et al.

[11] Patent Number: 5,064,539
[45] Date of Patent: Nov. 12, 1991

[54] METHOD OF CHROMATOGRAPHIC SEPARATION

[75] Inventors: Masatake Tanimura; Masao Tamura; Takashi Teshima, Tokyo, all of Japan

[73] Assignee: Ryoka Techno Engineering & Construction Co., Tokyo, Japan

[21] Appl. No.: 608,591

[22] Filed: Oct. 31, 1990

Related U.S. Application Data

[63] Continuation of Ser. No. 349,551, May 9, 1989, abandoned.

[30] Foreign Application Priority Data

May 17, 1988 [JP] Japan .................... 63-119784
Dec. 27, 1988 [JP] Japan .................... 63-330560

[51] Int. Cl.⁵ ............................... B01D 15/08
[52] U.S. Cl. ..................... 210/659; 210/198.2; 127/46.1; 127/46.2
[58] Field of Search ............ 127/30, 46.1, 46.2, 127/46.3, 55; 210/656, 659, 198.2

[56] References Cited

U.S. PATENT DOCUMENTS

| | | | |
|---|---|---|---|
| 2,985,589 | 5/1961 | Broughton | 585/822 |
| 3,291,726 | 12/1966 | Broughton | 585/822 |
| 3,373,872 | 3/1968 | Hrding | 210/659 |
| 3,847,550 | 11/1974 | Scott | 210/659 |
| 4,332,623 | 6/1982 | Ando | 127/46.2 |
| 4,366,060 | 12/1982 | Leiser | 127/462 |
| 4,379,751 | 4/1983 | Yoritomi | 210/659 |
| 4,402,832 | 9/1983 | Gerhold | 127/46.2 |
| 4,412,866 | 11/1983 | Schoenrock | 210/656 |
| 4,422,881 | 12/1983 | Devas | 127/46.2 |
| 4,426,232 | 1/1984 | Neuzil et al. | 127/463 |
| 4,478,721 | 10/1984 | Gerhold | 210/659 |
| 4,498,991 | 2/1985 | Oroskar | 210/659 |

FOREIGN PATENT DOCUMENTS

| | | | |
|---|---|---|---|
| 0010769 | 5/1980 | European Pat. Off. | 210/659 |
| 0279946 | 8/1988 | European Pat. Off. | 210/659 |

Primary Examiner—Ernest G. Therkorn
Attorney, Agent, or Firm—Sughrue, Mion, Zinn, Macpeak & Seas

[57] ABSTRACT

In a method using a chromatographic separation apparatus consisting of plurality of unit packed beds each having a supply inlet/extraction outlet, wherein the apparatus is effectively divided into four zones; an adsorption zone, a refining zone, a desorption zone, and a concentration zone. A supply and extraction step is performed in which all of the fluid flowing out of the adsorption zone is extracted through the nonadsorbate fluid extraction outlet, and then a recycle step, in which no fluid is supplied to or extracted from the bed, is performed to move the concentration distributions in the bed to a desired position. As a result, the method requires fewer unit beds, and enables extraction of components of higher purity.

4 Claims, 1 Drawing Sheet

METHOD OF CHROMATOGRAPHIC SEPARATION

This is a continuation of application Ser. No. 07/349,551 filed May 9, 1989, now abandoned.

BACKGROUND OF THE INVENTION

The present invention relates to a method of chromatographic separation, in which a feedstock fluid and a desorbent fluid are supplied into an adsorbent-packed bed, and wherein, as the feedstock fluid moves through the bed, the components in said fluid are separated by interaction with the adsorbent. At least two fluids, one being rich in a component that interacts strongly with the adsorbent and the other being rich in a component that interacts weakly with the adsorbent, are extracted from the bed.

Chromatographic separation is one separation technique practiced extensively in industrial applications. While several techniques of chromatographic separation are known, a simulated moving-bed system has been used most extensively in large-scale operation. In such a system, a fluid stream circulates in the same direction through a bed packed with an adsorbent. The bed is provided with more than one supply inlet and more than one extraction outlet. More specifically, a feedstock fluid supply inlet, a nonadsorbate fluid extraction outlet, a desorbent fluid supply inlet, and an adsorbate fluid extraction outlet are arranged, in that order, in the direction of fluid flow. During the separating operation, one supply inlet/extraction outlet pair is always in an active state. As a predetermined working time lapses, this active pair is made inactive, and the next corresponding pair, which is located immediately downstream, is made active. Therefore, when as many switching operations as there are supply inlet/extraction outlet pairs in the bed have been effected, the active supply inlet/extraction outlet pair is the same as just before the first switching operation was performed.

For the purpose of the following discussion, the zone from a certain supply inlet or extraction outlet to a corresponding supply inlet or extraction outlet that is located immediately downstream will be referred to as "a unit packed bed." A packed beds can be regarded as a series connection of as many unit packed beds as the number of supply inlet/extraction outlet pairs employed. The "feedstock fluid supply inlet", "desorbent fluid supply inlet", "nonadsorbate fluid extraction outlet", and "adsorbate fluid extraction outlet" are named based on the function of an apparatus for supplying a fluid into or extracting it from the bed, and in practice, a single apparatus may have the ability to perform more than one of the four functions of interest. In fact, it is common practice for a single apparatus to serve both as a feedstock fluid inlet and as a desorbent fluid supply inlet, or serve both as a nonadsorbate fluid extraction outlet and as an adsorbate fluid extraction outlet.

With respect to an active supply inlet/extraction outlet pair, the zone between a feedstock fluid supply inlet and a nonadsorbate fluid extraction outlet is referred to as an adsorption zone; the zone between the nonadsorbate fluid extraction outlet and a desorbent fluid supply inlet is referred to as a refining zone; the zone between the desorbent fluid supply inlet and an adsorbate fluid extraction outlet is referred to as a desorption zone; and the zone between the adsorbate fluid extraction outlet and the feedstock fluid supply inlet is referred to as a concentration zone. Therefore, the packed bed consists of four zones, each zone normally containing a plurality of unit packed beds.

Each of the components to be separated in the packed bed has a particular concentration distribution in the direction of feed flow. This concentration distribution will move downstream through successive zones of the bed while retaining its shape. One supply inlet/extraction outlet pair is switched to another pair in synchronism with the movement of concentration distributions so that a fluid can be supplied to a desired position on a particular concentration distribution while another fluid is extracted from another desired position.

In the basic operation of a simulated moving bed, feedstock fluid and a desorbent fluid may be supplied into the bed through certain supply inlets at any point of time, and a nonadsorbate fluid and an adsorbate fluid are extracted through certain extraction outlets. As a result, the operation can be regarded as being continuous on the whole with respect to the supply and extraction of fluids. The fluid to be extracted is only part of the fluid that reaches a cross section of the bed at which the outlet through which it is extracted is positioned, and the greater part of the fluid will move downstream without being extracted.

Normally, an amount of fluid equal to 4–10 times the volume of the fluid that is supplied into each zone from the outside of the bed, or which is extracted from each zone to the outside of the bed, will flow into each zone from the zone located upstream thereof. Therefore, a particular concentration distribution that is formed in the bed is capable of moving downstream without being greatly distorted in spite of fluid extraction from the bed.

As described above, a supply inlet/extraction outlet pair is switched to a pair immediately downstream in synchronism with the downstream movement of a particular concentration distribution formed in the bed. Although movement of a concentration distribution is continuous, switching between adjacent supply inlet-/extraction outlet pairs is intermittent, resulting in a time-dependent change in the composition of a fluid being extracted through one outlet within a unit working time. In order to attain better separation performance, it is preferable that the fluid being extracted should experience the smallest possible change in composition as a function of time. To this end, the duration for which a supply inlet/extraction outlet pair is in active operation must be shortened, and frequently must be switched to successive supply inlet/extraction outlet pairs located downstream of the bed. However, such requires a bed composed of many unit packed beds, and so the overall equipment becomes complex and costly. In consideration of cost and desired separation efficiency, the equipment typically used consists of 6–24 unit packed beds.

SUMMARY OF THE INVENTION

In view of the foregoing, one object of the present invention is to provide a method of chromatographic separation that is capable of attaining a satisfactory separation efficiency with a simpler apparatus, such as one composed of as few as four unit packed beds.

This and other objects of the present invention generally can be attained by a method which performs separation of respective substances in a feedstock fluid with a chromatographic apparatus including a packed bed that allows a fluid to flow cyclically in one direction and which is furnished with at least four pairs of supply inlet/extraction outlet; a feedstock fluid supply inlet, a nonadsorbate fluid extraction outlet, a desorbent fluid supply inlet, and an adsorbate fluid extraction outlet, disposed in that order along the direction of fluid flow. The bed, taken as a whole, is divided into four zones by an active pair of supply inlet/extraction outlet during operation: an adsorption zone occupying the space between the feedstock fluid supply inlet and the nonadsorbate fluid extraction outlet; a refining zone occupying the space between the nonadsorbate fluid extraction outlet and the desorbent fluid supply inlet; a desorption zone occupying the space between the desorbent fluid supply inlet and the adsorbate fluid extraction outlet; and a concentration zone occupying the space between the adsorbate fluid extration outlet and the feedstock fluid supply inlet. One supply inlet/extraction outlet pair switches to another such pair located immediately downstream after the lapse of a predetermined working time.

The object of the present invention can be attained specifically by performing the following two steps within the predetermined working time:

(i) a supply and extraction step in which, as part of the fluid flowing out of the desorption zone is extracted from the packed bed through the adsorbate fluid extraction outlet and the remainder is allowed to flow into the concentration zone while the fluid flowing out of the concentration zone is allowed to flow into the adsorption zone, a feedstock fluid and a desorbent fluid are supplied into the packed bed through the feedstock fluid supply inlet and the desorbent fluid supply inlet, respectively, and all or substantially all of the fluid flowing out the adsorption zone is extracted from the packed bed through the nonadsorbate fluid extraction outlet; and (ii) a circulation step in which the fluid in the packed bed is moved downstream without supplying a fluid into the bed or extracting a fluid from the bed.

By performing these two steps within the predetermined working time, satisfactory separating performance can be attained in the present invention.

It has been known to perform step (i), but only be extracting less than all of the fluid through the nonadsorbate fluid extraction outlet. The present invention is more effective than that known technique.

DETAILED DESCRIPTION OF THE PREFERRED EMBODIMENT

The method of the present invention is performed with an ordinary simulated moving bed (though the number of unit packed beds in it may be smaller than in the prior art system) but the difference is in the way of operating such a conventional simulated moving bed. In accordance with the present invention, when a feedstock fluid and a desorbent fluid are supplied into the bed and a nonadsorbate fluid and an adsorbate fluid are extracted from the bed simultaneously, all or substantially all of the fluid in the bed that has reached the position of the nonadsorbate fluid extraction outlet is extracted as a nonadsorbate fluid.

In this respect, the method of the present invention differs from both the basic method of operating a simulated moving bed and from any other known methods of operation. As part of the inventive method, the fluid is supplied into or extracted from the bed intermittently; in other words, when taken as a whole, the operation of the bed includes a period during which only the fluid in the bed is moved downstream without supplying a fluid into or extracting it from the bed.

Figure 2:
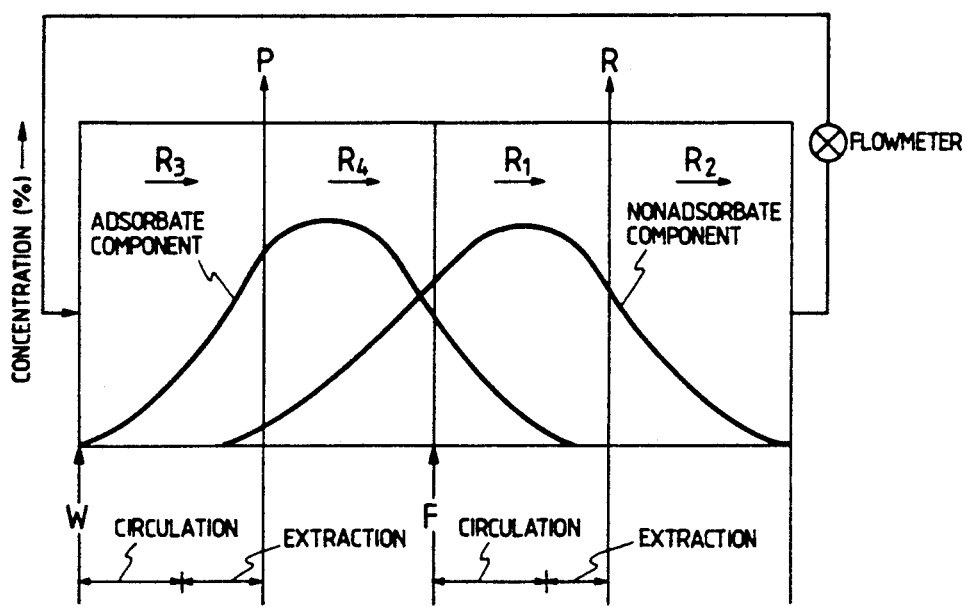
FIG. 2 is a diagram showing concentration distributions formed within a packed bed.

As already mentioned, a simulated moving bed consists of four zones and the adsorbate and nonadsorbate components in each zone have concentration distributions, typically as shown in FIG. 2. The adsorbate component is present at high concentration in the desorption zone, but it is not easy to move this component downstream of the bed because it interacts strongly with the packed adsorbent. On the other hand, the nonadsorbate component is predominant in the refining zone and can be readily moved downstream of the bed because its interaction with the adsorbent is weak. In this way, the ease with which a certain concentration distribution can be moved downstream varies depending upon the zone in which it is formed.

The amount or distance that the concentration distribution in each zone moves is proportional to the quantity of a fluid flowing through that zone, or the product of its flow rate (volume per unit time) and time. Therefore, in order to ensure that the concentration distribution in each zone is moved by the same amount, or by the width of a unit packed bed, within the duration of time for which a pair of supply inlet/extraction outlet is operated, it is necessary that the quantity of the fluid flowing through each zone be adjusted to be an appropriate value. For instance, the flow rate in the refining zone must be set to a value smaller than that in any other zone.

In accordance with the present invention, concentration distributions in each zone are moved through two stages. The first stage is one in which a feedstock fluid and a desorbent fluid are supplied to the bed, and a nonadsorbate fluid and an adsorbate fluid are extracted from the bed. At this stage, the flow rate of a fluid stream differs from zone to zone, as it is subject to the influences both of the rate (volume per unit time) at which a fluid is supplied to the bed and the rate at which a fluid is extracted from the bed. The second stage is where the fluid is simply allowed to flow downstream of the bed with a fluid being neither supplied into nor extracted from the bed. This stage is solely for the purpose of moving concentration distributions and the flow rate and hence, the quantity of a fluid in each zone is held constant.

In the method of the present invention, an adsorbate fluid and a nonadsorbate fluid are extracted from the bed only at the first stage described above. The amounts by which concentration distributions are moved at the first stage are smaller than the total amount of movement effected when a supply inlet/extraction outlet pair is in an operational state, and therefore, the adsorbate and nonadsorbate fluids being extracted from the bed will experience a smaller time-dependent change in composition. In other words, compared to the prior art simulated moving-bed system in which fluids are extracted from the bed throughout the process of movement of concentration distributions in the bed, thereby causing substantial time-dependent changes in the compositions of extracted fluids, the method of the present invention successfully reduces such time-dependent changes by extracting fluids in only part of the process of movement of concentration distributions.

Figure 1:
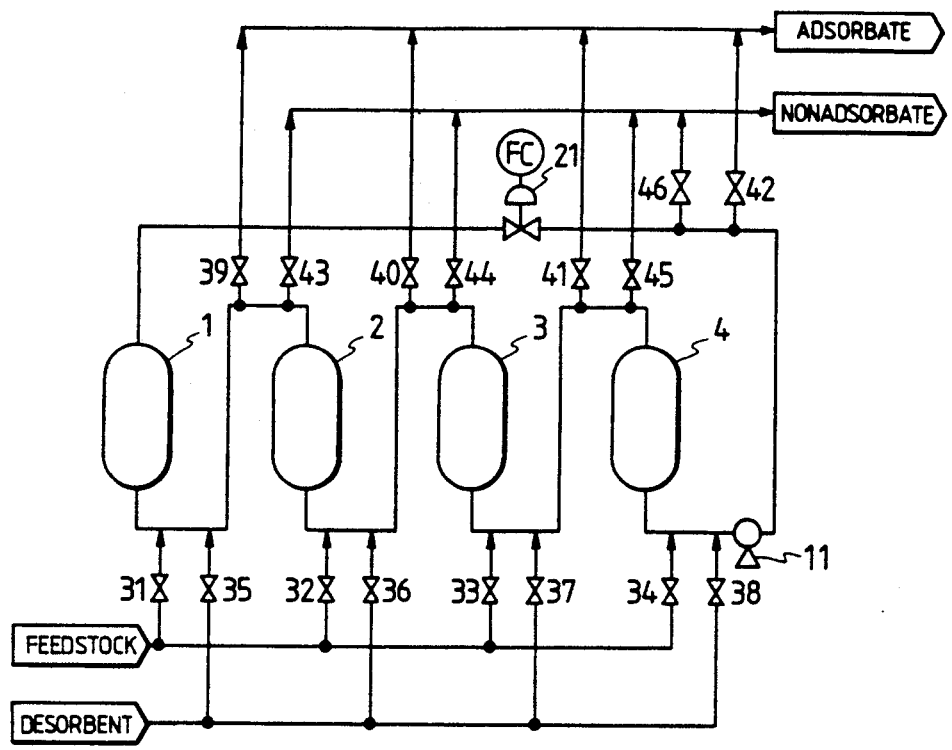
FIG. 1 is a schematic of an apparatus suitable for use in the practice of the present invention.

The present invention now will be described hereinafter in greater detail with reference to the accompanying drawings. FIG. 1 is a schematic of a chromatographic separation apparatus that may be used in the practice of the present invention. Unit beds 1-4 each are packed with an adsorbent, and a circulation pump 11 circulates fluids in the bed. A flow control valve 21 controls circulation from a downstream end to an upstream end of the packed bed. Feedstock fluid supply valves 31-34 and desorbent fluid supply valves 35-38 control supply of feedstock and desorbent fluid, respectively, into the bed. Adsorbate fluid extraction valves 39-42 and nonadsorbate fluid extraction valves 43-46 control extraction adsorbate and nonadsorbate fluids, respectively, from the bed.

FIG. 2 is a diagram showing the concentration distributions of the respective components formed within the packed beds when the apparatus shown in FIG. 1 is operated by the method of the present invention. FIG. 2 also shows the positions at which the supply of a feedstock fluid and a desorbent fluid into the bed is started (F and W), as well as the positions at which the extraction of an adsorbate fluid and a nonadsorbate fluid from the bed is started (P and R).

Referring to FIGS. 1 and 2, a supply and extraction step first is performed with the circulation pump 11 and the flow control valve 21 being operated to circulate a predetermined amount of fluid. In this step, the feedstock and the desorbent are supplied through valves 31 and 37, respectively, while at the same time, the adsorbate fluid and the nonadsorbate fluid are extracted through valves 42 and 44, respectively. A fluid flows down the adsorption, refining, desorption and concentration zones at respective rates of $R_1$, $R_2$, $R_3$ and $R_4$ (volume per unit time). The supply and extraction step continues for a time period $\theta_1$.

Then, the supply of fluid to the beds and the extraction of fluid from the beds are stopped and a circulation step is performed, in which only the circulation of fluid through beds is effected by means of the circulation pump 11 until the concentration distribution curves are moved to their predetermined positions. A fluid flows down each zone at a rate of $R_0$ (volume per unit time). The circulation step continues for a time period $\theta_0$.

The above procedures complete the predetermined operation of valves 31, 37, 42 and 44 (step 1). Operation then is switched to their corresponding valves 32, 38, 39 and 45 located downstream. These valves are brought to an active state to repeating the operation described above (step 2).

The apparatus shown in FIG. 1 consists of four unit packed beds, so four valve switching operations will bring the apparatus back to its initial state. The valves which are opened after each switching operation, the switching times and the settings of a flowmeter are shown in Table 1 below.

TABLE 1

| Step | Description | Opened Valves | Flowmeter Setting | Switching Time |
|---|---|---|---|---|
| 1 | supply/extraction step | 32,37,42,44 | $R_4$ | $\theta_1$ |
|   | circulation step | — | $R_0$ | $\theta_0$ |
| 2 | supply/extraction step | 32,38,39,45 | $R_3$ | $\theta_1$ |
|   | circulation step | — | $R_0$ | $\theta_0$ |
| 3 | supply/extraction step | 33,35,40,46 | $R_2$ | $\theta_1$ |

TABLE 1-continued

| Step | Description | Opened Valves | Flowmeter Setting | Switching Time |
|---|---|---|---|---|
|   | circulation step | — | $R_0$ | $\theta_0$ |
| 4 | supply/extraction step | 34,36,41,43 | $R_1$ | $\theta_1$ |
|   | circulation step | — | $R_0$ | $\theta_0$ |

Now, consider the case where the apparatus shown in FIG. 1 is run in accordance with the prior art method of operating a simulated moving bed and the working times (i.e., valve switching times) are adjusted to the same values as adopted in the method of the present invention. Suppose a fluid flows through the adsorption, refining, desorption and concentration zones at respective rates (volume per unit time) of $R_1'$, $R_2'$, $R_3'$, and $R_4'$. In order to ensure that, in both methods, the concentration distributions in each zone are moved within a given working time by the same amount, the flow quantity within that working time must be made equal for each zone. This requires:

$$R_1'(\theta_0+\theta_1)=R_1\theta_1+R_0\theta_0 \quad (1)$$

$$R_2'(\theta_0+\theta_1)=R_2\theta_1+R_0\theta_0 \quad (2)$$

$$R_3'(\theta_0+\theta_1)=R_3\theta_1+R_0\theta_0 \quad (3)$$

$$R_4'(\theta_0+\theta_1)=R_4\theta_1+R_0\theta_0 \quad (4)$$

In the method of the present invention, the ratio of the amount of movement of concentration distributions in the supply and extraction step to the total amount of movement of concentration distributions in the adsorption zone within a given working time, namely, the ratio $r_1$ of the width of the portion of concentration distributions extracted as a nonadsorbate fluid to the width of concentration distributions moved in the adsorption zone is given as follows from equation (1):

$$\begin{aligned} r_1 &= R_1\theta_1/(R_1\theta_1 + R_0\theta_0) \\ &= \{R_1'(\theta_0 + \theta_1) - R_0\theta_0\}/ \\ &\quad R_1'(\theta_0 + \theta_1) \end{aligned} \quad (5)$$

Similarly, the ratio $r_2$ of the width of the portion of concentration distributions extracted as an adsorbate fluid to the width of concentration distributions moved in the desorption zone is given as follows from equation (3):

$$\begin{aligned} r_2 &= R_3\theta_1/(R_3\theta_1 + R_0\theta_0) \\ &= \{R_3'(\theta_0 + \theta_1) - R_0\theta_0\}/ \\ &\quad R_3'(\theta_0 + \theta_1) \end{aligned} \quad (6)$$

The smaller the value of r, the smaller the change that occurs in the composition of the extracted fluid. Equations (5) and (6) show that r is a minimum when $R_0\theta_0$ is a maximum. As stated earlier, the quantity of flow in the refining zone is a minimum in the usual operation of a simulated moving bed and equation (2) shows that when $R_2\theta_1=0$, the quantity of flow in the refining zone becomes a minimum, irrespective of the value of $R_0\theta_0$. This means that, in the supply and extraction step, the quantity of fluid flowing through the refining zone is reduced to zero, or all the quantity of fluid flowing down the adsorption zone is extracted as a nonadsorbate fluid. In this case, the quantity of nonadsorbate fluid extracted obviously is greater than that of the feedstock fluid supplied because the quantity of the adsorbate fluid extracted simultaneously is smaller than that of the desorbent supplied, and an amount of fluid corresponding to that difference will flow into the adsorption zone via the concentration zone. This also enables the simulated moving bed to be run without violating its basic operating principle that the quantity of flow in the refining zone, $R_2\theta_1 + R_0\theta_0$, must be held smaller than that in the concentration zone, $R_4\theta_1 + R_0\theta_0$.

FIG. 2 shows schematically which portion of the concentration distributions in the adsorption and desorption zones will be extracted from the bed. Fluid flows to the right as viewed in the drawing, and the concentration distribution curves also are shifted to the right. In the supply and extraction step of the method of the present invention, the concentration distribution curves are shifted and fluid are extracted from part of the width of the concentration distribution curves in the adsorption and desorption zones. Subsequently, there occurs only a shift in the concentration distribution curves in the circulation step. When the total of the widths by which the concentration distribution curves are shifted in the two steps becomes equal to the width of a unit packed bed, the supply inlet/extraction outlet pair located immediately downstream is activated and the procedures described above will be repeated.

The prior art method of chromatographic separation on a simulated moving-bed system does not have a circulation step and fluids are supplied and extracted from the width of concentration curves corresponding to that of a unit packed bed. As a result, r is always maintained at unity. If the number of beds is small, the concentration at each extracting portion will vary greatly between the starting point of extraction and the end point, thereby making it difficult to produce satisfactory results. Furthermore in the case above described, the width of each supply portion becomes large and there occurs a corresponding increase in disturbances, leading to low separation efficiency.

In accordance with the present invention, the width over which fluids are supplied or extracted can be so adjusted as to ensure high separation efficiency in the presence of a small number of beds.

The following examples are provided for the purpose of further illustrating the present invention, but it should be understood that various modifications can be made to these examples without departing from the spirit and scope of the invention.

EXAMPLE 1

Using an apparatus of the type shown in FIG. 1, a feedstock (a mixture of fructose and glucose in aqueous solution) having the composition shown in Table 2 was separated chromatographically. The adsorbent and desorbent used were a Ca-form strongly acidic cation-exchange resin (DIAION(TM)FRK-101 of Mitsubishi Kasei Corp.) and water, respectively.

TABLE 2

| Component | Feedstock | Fructose Fraction | Glucose Fraction | Recovery |
|---|---|---|---|---|
| Fructose | 45.1 | 93.8 | 3.7 | 95.5 |
| Glucose | 50.3 | 4.9 | 89.0 | 95.6 |
| Oligo- | 4.6 | 1.3 | 7.3 | — |

TABLE 2-continued

| Component | Feedstock | Fructose Fraction | Glucose Fraction | Recovery |
|---|---|---|---|---|
| saccharide wt %-DS | 60.2 | 36.6 | 25.5 | — |

A bed composed of four series-connected columns packed with a total of 3,140 ml of adsorbent was held at 65° C., and cyclic separation was performed under the conditions shown in Table 3 below:

TABLE 3

| Parameter | Unit | Value |
|---|---|---|
| $R_0$ | ml/h | 1292 |
| $R_1$ | ml/h | 1292 |
| $R_2$ | ml/h | 0 |
| $R_3$ | ml/h | 1209 |
| $R_4$ | ml/h | 409 |
| $\theta_1$ | sec | 390 |
| $\theta_0$ | sec | 1022 |

In order to minimize the width of fluid supply and extraction, $R_2$ was adjusted to zero, and in order to ensure that the pressure loss occurring in the packed bed in the supply and extraction step would be substantially equal to that occurring in the circulation step, $R_0$ was made equal to $R_1$.

The composition of each fraction after a steady state was reached and the recovery of each component are shown in Table 2.

EXAMPLE 2

An aqueous solution of oligosaccharide having the composition shown in Table 4 was subjected to chromatographic separation using the same apparatus as that employed in Example 1 except that a Na-form strongly acidic cation-exchange resin (DIAION(TM) UBK-530K) was used as an adsorbent. The specific conditions of the experiment are shown in Table 5 below.

TABLE 4

| Component | Feedstock | $DP_2$ Fraction | $DP_{3+}$ Fraction | Recovery |
|---|---|---|---|---|
| $DP_1$ | 1.10 | 1.20 | 0.76 | — |
| $DP_2$ | 48.30 | 82.10 | 4.71 | 95.8 |
| $DP_{3+}$ | 50.60 | 16.70 | 94.53 | 81.1 |
| wt %-DS | 60 | 15.4 | 10.1 | — |

TABLE 5

| Parameter | Unit | Value |
|---|---|---|
| $R_0$ | ml/h | 1814 |
| $R_1$ | ml/h | 1179 |
| $R_2$ | ml/h | 0 |
| $R_3$ | ml/h | 1814 |
| $R_4$ | ml/h | 817 |
| $\theta_1$ | sec | 205 |
| $\theta_0$ | sec | 585 |

In the experiment of Example 2, $R_2 = 0$ and $R_0 = R_3$. The composition of each fraction after a steady state was reached and the recovery of each component are shown in Table 4.

COMPARATIVE EXAMPLES 1 AND 2

The same feedstocks as those supplied in Examples 1 and 2 were subjected to chromatographic separation by a prior art 8-bed simulated moving-bed system under the same fluid loads and desorbent ratios as those employed in Examples 1 and 2. The results are shown in Tables 6 and 7.

TABLE 6

| Component | Feedstock | Fructose Fraction | Glucose Fraction | Recovery |
|---|---|---|---|---|
| Fructose | 42.4 | 91.9 | 4.9 | 93.8 |
| Glucose | 52.3 | 6.8 | 87.1 | 94.4 |
| Oligosaccharide | 5.3 | 1.3 | 8.0 | — |
| wt %-DS | 59.9 | 33.9 | 26.0 | — |

TABLE 7

| Component | Feedstock | $DP_2$ Fraction | $DP_{3+}$ Fraction | Recovery |
|---|---|---|---|---|
| $DP_1$ | 1.00 | 1.00 | 0.90 | — |
| $DP_2$ | 49.30 | 75.80 | 5.30 | 95.9 |
| $DP_{3+}$ | 49.70 | 23.20 | 93.80 | 71.4 |
| wt %-DS | 60.3 | 18.6 | 8.4 | — |

In Example 1, the experiment was conducted in order to obtain a pure product of fructose. Comparison between Tables 2 and 6 shows that the method of the present invention achieved an improvement of almost two points in purity and recovery.

In Example 2, the experiment was conducted in order to obtain a pure product of $DP_{3+}$. Comparison between Tables 4 and 7 shows that the method of the present invention achieved an improvement of almost 10 points in recovery.

As described on the foregoing pages, if the volume of feedstock solution, the value of desorbent ratio and the amount of adsorbent are the same, the chromatographic separation method of the present invention attains results that are comparable to or better than those accomplished by a conventional simulated moving-bed system employing a greater number of beds. Therefore, the method of the present invention permits the use of a simpler apparatus and realizes a significant reduction in initial cost.

What is claimed is:

1. In a method for separating respective substances in a feedstock fluid with a chromatographic apparatus including a packed bed in which fluid flows cyclically in one direction and which further includes a plurality of fluid inlets and fluid outlets, including a feedstock fluid supply inlet, a nonadsorbate fluid extraction outlet, a desorbent fluid supply inlet, and a adsorbate fluid extraction outlet, disposed in that order along the direction of fluid flow, said bed, taken as a whole, being divided into four zones: an adsorption zone, occupying a space between the feedstock fluid supply inlet and the nonadsorbate fluid extraction outlet; a refining zone, occupying a space between the nonadsorbate fluid extraction outlet and the desorbent fluid supply inlet; a desorption zone, occupying a space between the desorbent fluid supply inlet and the adsorbate fluid extraction outlet; and a concentration zone, occupying a space between the adsorbate fluid extraction outlet and the feedstock fluid supply inlet, one supply inlet/extraction outlet pair being switched to another supply inlet/extraction outlet pair located downstream thereof after a predetermined working time, the improvement wherein the following two steps are performed within said predetermined working time:

(i) a supply and extraction step in which, as part of the fluid flowing out of the desorption zone is extracted from the packed bed through the adsorbate fluid extraction outlet and the remainder flows into the concentration zone while the fluid flowing out of the concentration zone flows into the adsorption zone, a feedstock fluid and a desorbent fluid are supplied into the packed bed through the feedstock fluid supply inlet and the desorbent fluid supply inlet, respectively, and substantially all of the fluid flowing out of the adsorption zone is extracted from the packed bed through the nonadsorbate fluid extraction outlet, such that an amount of the fluid extracted through the nonadsorbate fluid extraction outlet is greater than an amount of feedstock fluid supplied, and an amount of the fluid extracted through the adsorbate fluid extraction outlet is less than an amount of desorbent fluid supplied; and (ii) a circulation step in which the fluid in the packed bed is moved downstream without supplying a fluid into or extracting a fluid from the bed.

2. A method as claimed in claim 1, wherein in said step (i) all of the fluid flowing out of the adsorption zone is extracted from the packed bed through the nonadsorbate fluid extraction outlet.

3. A method as claimed in claim 1, wherein at least one of said plurality of fluid inlets functions as both a feedstock fluid inlet and a desorbent fluid inlet.

4. A method as claimed in claim 1, wherein at least one of said plurality of fluid outlets functions as both an adsorbate fluid outlet and a nonadsorbate fluid outlet.

* * * * *